F. C. DU BOIS.
COAL OIL BURNER.
APPLICATION FILED JULY 3, 1916.
1,247,513.
Patented Nov. 20, 1917.
2 SHEETS—SHEET 2.
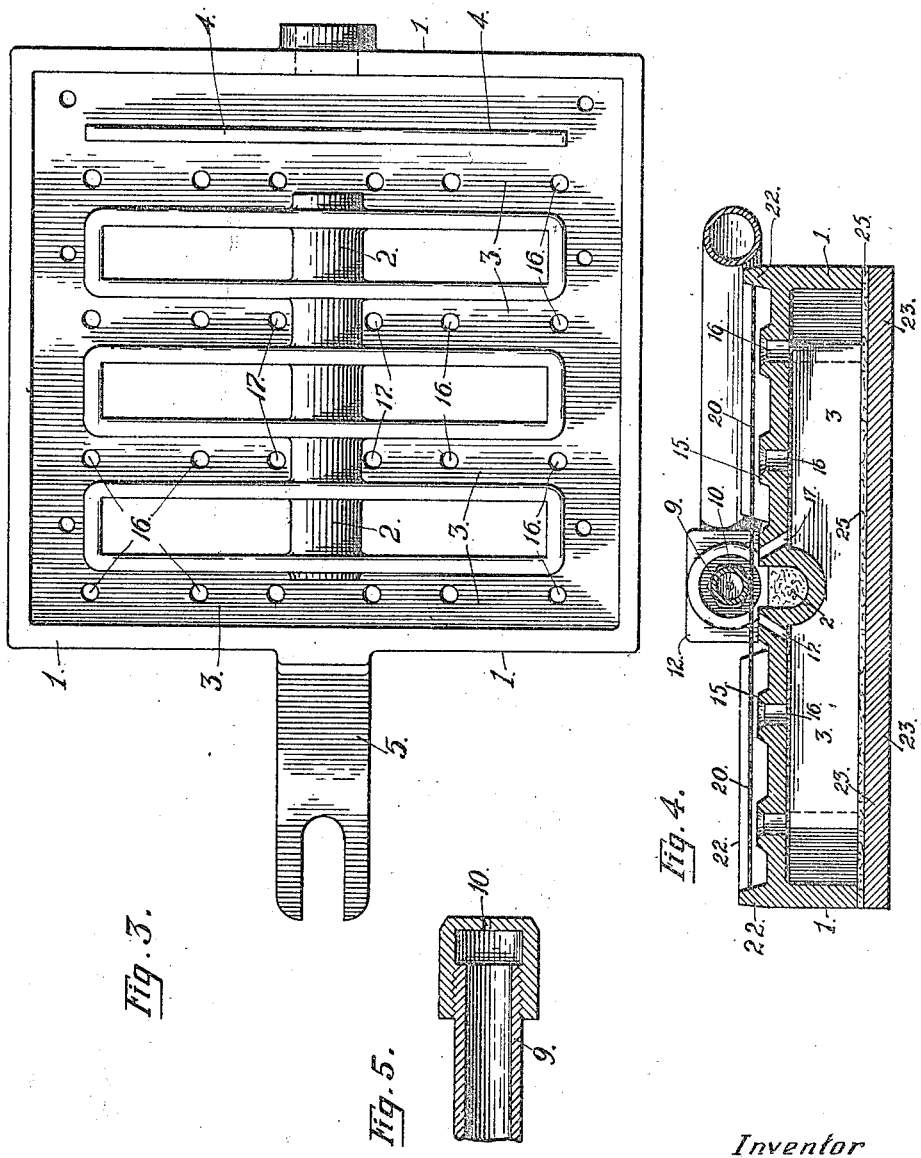
Inventor
Francis C. DuBois
By Arthur L. Slee,
His Atty.

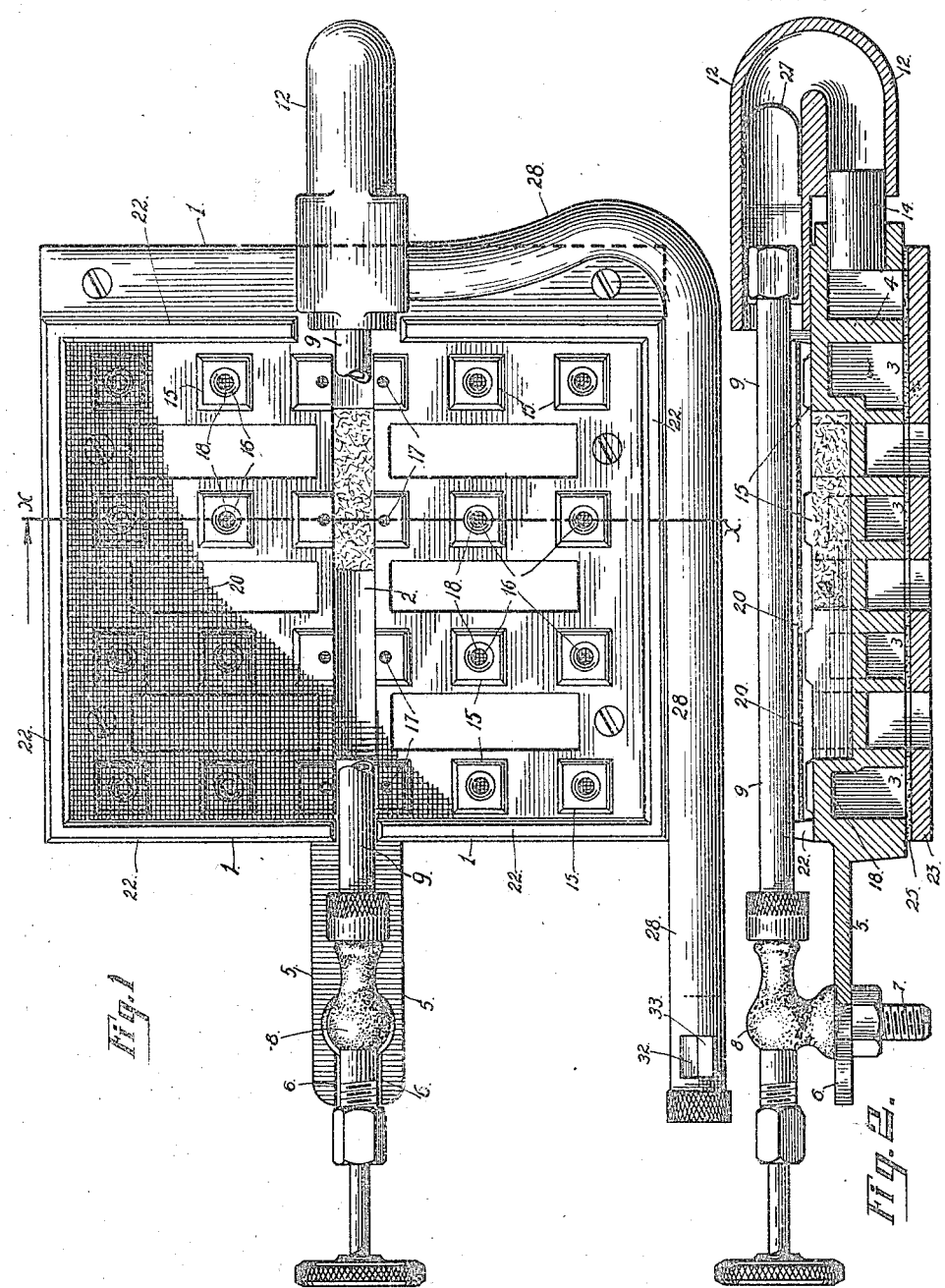

UNITED STATES PATENT OFFICE.

FRANCIS C. DU BOIS, OF SAN JOSE, CALIFORNIA.

COAL-OIL BURNER.

1,247,513.  Specification of Letters Patent.  Patented Nov. 20, 1917.

Application filed July 3, 1916. Serial No. 107,479.

*To all whom it may concern:*

Be it known that I, FRANCIS C. DU BOIS, a citizen of the United States, residing in the city of San Jose, county of Santa Clara, State of California, have invented a new and useful Improvement in Coal-Oil Burners, of which the following is a specification.

My invention relates to coal oil burners wherein a generator operates in conjunction with a hollow rectangular plate having a baffle plate and parallel channels provided with apertures; and the objects of my invention are first, to provide improved means for generating a vapor from coal oil; second, to provide means for mixing the requisite amount of air with the vapor essential for proper combustion; third, to provide means for regulating the air supply; fourth, to provide means for regulating the supply of oil; fifth, to provide means for breaking up and mixing the air and vapor; sixth, to provide means for equally distributing the mixed air and vapor through parallel channels and apertures therein; seventh, to provide means for separating the jets of mixed air and vapor emanating from the apertures so as to spread the flame horizontally; and eighth, to provide means for preventing air currents from disturbing the flame.

I accomplish these several features by means of the device disclosed in the drawings forming a part of the present specification wherein like characters of reference are used to designate similar parts throughout the said specification and drawings, and in which—

Figure 1 is a plan view of the burner with the upper screen partly broken away disclosing the generator located approximately in the center thereof, the channel under the generator by means of which the initial heat is applied thereto, the tube for conducting air into the burner, and the top screen for spreading the flame horizontally.

Fig. 2 is a longitudinally vertical sectional view of the burner disclosing the arcuate screen for breaking up the air and vapor before entrance into the burner, and the parallel rectangular channels within the burners.

Fig. 3 is a bottom view of the top portion of the burner disclosing the baffle plate and the parallel channels therein, and the bottom of the channel under the generator.

Fig. 4 is a transverse sectional view of the burner taken on line X—X of Fig. 1, disclosing the relative positions of the generator, the channel under the generator, the apertures in the parallel channels, and the top and inner screens arranged above and below the apertures.

Fig. 5 is an enlarged broken detailed view of the end of the generator disclosing the comparatively small aperture therein.

Referring to the drawings, the numeral 1 is used to designate a casing having a centrally disposed outer channel 2 therein and parallel internal channels 3 arranged transversely in respect to the channel 2, one of the end channels 3 being somewhat wider than the others and having a longitudinal baffle plate 4 therein.

A tongue 5 is formed integral with one side of the casing 1 and is provided with a slot 6 arranged to engage and retain the oil supply pipe 7, which terminates in a needle valve 8. A generator 9 is in turn secured to the needle valve 8 and is arranged to lie directly over the centrally disposed channel 2 of the casing 1. The end of the generator 9 is provided with a comparatively small aperture 10, the purpose of which will hereinafter be more fully set forth. The end of the generator 9 having the aperture 10 therein, projects slightly into the open end of a return bend 12, the other end of the said return bend 12 being connected to the interior of the casing 1 by means of a nipple 14, so that the said return bend 12 and nipple 14 will conduct a current of air and vapor onto the approximate center of the baffle plate 4.

The channels are provided with a series of lugs 15, each having an aperture 16 therein and a second series of inclined apertures 17, which are directed onto the generator 9, arranged above the centrally disposed channel 2.

A screen 18 is provided within the casing and under the apertures 16 within the channels 3 thereof. While a second screen 20 is arranged directly above the apertures 16 and is retained in position by means of a flange 22 integral with the casing 1 and arranged around the outer sides thereof.

The casing 1 is provided with a bottom plate 23 and a suitable gasket 25.

The operation is as follows:

The channel 2 below the generator 9 is provided with an absorbent non-inflammable material, preferably shredded asbestos, into which a small part of oil is introduced. The oil is ignited and the heat therefrom heats the generator 9 and vaporizes the coal oil within the generator 9 until the expansion due to the evaporation thereof forces the resulting vapor through the aperture 10 of the generator 9 and into the open end of the return bend 12 and against the arcuate screen 27 therein. The force of the injected vapor will create an inwardly moving air current through the air tube 28 and the current of air thus induced will be projected against the arcuate screen 27 and partially broken up.

The air and vapor in traversing the curved portion of the return bend 12 will be thoroughly mixed and continue through the nipple 14 into the interior of the casing 1 and against the approximate center of the baffle plate 4, which will deflect the mixture around and into the parallel channels 3 through the apertures 16 and 17 therein and against the under side of the screen 20, which will tend to spread horizontally the mixture emanating from the apertures 16 and 17, which will be ignited above the screen 20 by means of the initial flame provided by the oil in the asbestos in the channel 2.

As the vapor is thus ignited, the supply of oil to the generator 9 may be regulated by means of the needle valve 8. Similarly, the supply of air through the air tube 28 may be regulated by means of the shutter 32 which is arranged in operative relation to the aperture 33 in the outer end of the said air tube 28.

Inasmuch as the screen 20 is arranged slightly below the top of flange 22 of the burner 1, it is evident that any horizontal air currents will be deflected and be prevented from disturbing the flame.

Referring to Fig. 4 of the drawings, it will be seen that the inclined apertures 17 from the channel 3 are directed onto the generator 9, so that after the initial charge of oil in the outer channel 2 is consumed, that the generator will continue to be heated by the flame produced above the screen 20 and the said apertures 17.

I am aware that the present state of the art discloses burners having generators and means for providing and mixing air with the vapor from the generator, I therefore do not wish to claim such a combination broadly, but what I do claim as my invention and desire to secure by Letters Patent is—

In a coal oil burner, the combination of a rectangular hollow burner casing composed of parallel channels having apertures therein, a centrally disposed outer channel in the upper surface thereof, and a flange arranged around the upper edges thereof; a generator arranged above the centrally disposed channel; a return bend secured to the burner casing and arranged to conduct vapor from the generator to the channels within the burner casing; an air tube arranged to conduct air into the return bend; an arcuate screen secured within the return bend and arranged to break up and mix the air and vapor therein; a screen within the burner casing and directly under the apertures in the channels; a second screen above the apertures; means for regulating the supply of air to the air tube; and means for regulating the supply of oil to the generator.

In witness whereof I hereunto set my signature.

FRANCIS C. DU BOIS